April 18, 1961 J. W. SCHINKE ET AL 2,979,852
FISH HOOK STRUCTURE
Filed Nov. 10, 1958
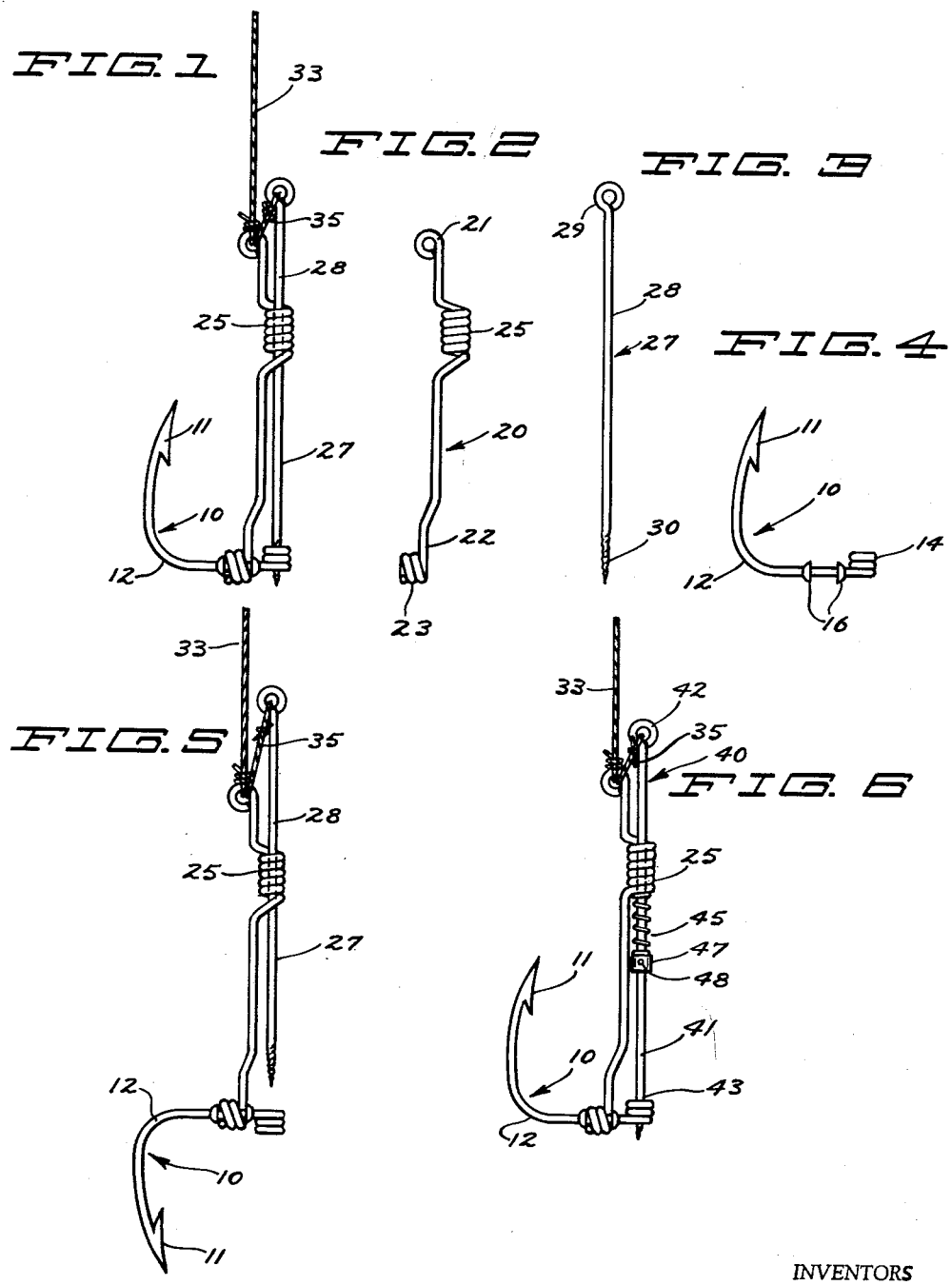
INVENTORS
JAMES W. SCHINKE
BY ALBERT FELSKE
ATTORNEYS United States Patent Office 2,979,852
Patented Apr. 18, 1961

2,979,852

FISH HOOK STRUCTURE

James W. Schinke, 1404 2nd St. SE., and Albert Felske, both of Rochester, Minn.; said Felske assignor to said Schinke Filed Nov. 10, 1958, Ser. No. 773,039

2 Claims. (Cl. 43—43.16)

This invention relates to a fish hooking device. The commonly used type of a fish hooking device is a rigid unitary hook and this type of hook is difficult to remove from the mouth of a fish. As a result of the difficulty in removing the ordinary type of hook from the mouth of a fish, said mouth is considerably damaged. This damage is particularly undersirable in those cases where for various reasons the fish are released and returned to the body of water from which taken.

It is desirable therefore to provide a fish hooking device adapted to be easily removed from the mouth of a fish with only very limited damage, if any at all, resulting from the removal of the hooking device from the mouth of the fish.

It is an object of this invention therefore to provide a fish hooking device adapted to have its parts in a fixed, rigid fishing condition and adapted to have its barbed or hooked portion capable of substantial freedom of movement for easy removal from the mouth of a fish.

It is another object of this invention to provide a fish hooking device comprised of a barbed hook portion, a staff or shank for said hook portion, and a member for operationally connecting said hook and staff portions to provide a rigid relationship therebetween for fishing purposes and adapted to permit said hook portion to be freely rotated in relation to said staff portion for easy removal of the hook portion from the mouth of a fish.

It is a more specific object of this invention to provide a fish hooking device comprising a hook portion, a staff or shank portion, said hook and staff portions being connected to permit said hook portion to rotate freely about an axis at right angles to the axis of said staff or shank portion, and a member carried by said staff or shank portion for removable connection with said hook portion to provide a rigid relationship between said staff and hook portions for fish catching purposes.

These and other objects and advantages of the invention will be fully set forth in the following description made in connection with the accompanying drawings in which like reference characters refer to similar parts throughout the several views and in which:

Fig. 1 is a view of applicants' device in side elevation;

Figs. 2, 3 and 4 are views in elevation showing the various separate portions of applicants' device separated;

Fig. 5 is a view in elevation similar to Fig. 1 showing a portion of applicants' device in different positions; and Fig. 6 is a view in side elevation showing a modification of applicants' device.

Applicants' fish hooking device may be variously made and is here illustrated on an enlarged scale. In the present embodiment with reference to Figs. 1–5, a hook portion 10 is shown. Said hook portion 10 is shown substantially in the form of a right angle having a barb 11 at one end thereof and upstanding in fishing position as indicated in Figs. 1 and 4. The bight portion 12 of said hook portion is smooth and of substantial curvature. The unbarbed end portion of said hook 10 is curved to form a plurality of superposed loops 14 in alignment. Adjacent said loops 14 on said hook 10 are spaced shoulders 16.

A staff or shank portion 20 is provided having a loop 21 at its upper end. The lower end portion 22 of said staff 20 is offset forwardly, as shown in Fig. 2, and has a plurality of loops 23 formed at its lower end. Said loops are formed about an axis at right angles to the axis of said staff 20. Said loops 23 are adapted to be disposed about said hook 10 between said spaced shoulders 16. Said staff 20 and said hook 10 may be assembled in various ways well known in the art. As here illustrated, said staff 20 has an upper portion offset rearwardly, as shown in Fig. 2, with a plurality of superposed loops 25 formed about an axis parallel to the axis of said staff 20.

A pin 27 is provided having a straight body portion 28 with a loop 29 formed at its upper end and a threaded portion 30 formed at its lower end. Said pin 27 is adapted to be disposed through the loops 25 and have its lower threaded end 30 engaged in the loop portion 14, as indicated in Fig. 1. A fishing line 33 will be secured to said loop 21. A safety line or flexible line 35 will connect said loops 21 and 29 to prevent the loss of said pin 27.

Applicants' device as above described may be formed of various suitable materials. It is here indicated as being formed of suitable rod-like material of small transverse dimension.

In operation for fishing purposes, applicants' fish hooking device will be assembled, as indicated in Fig. 1, with said pin 27 being threaded into the loop portion 14 to hold together said hook 10 and said staff 20 in a fixed rigid relationship so that operationally a unitary fish hooking device is formed. When a fish is caught and landed, said pin 27 will be disengaged from the loop portion 14 whereby said hook 10 will become freely rotatable about an axis at right angles to the axis of said staff 20. It has been found that when said hook 10 is freely rotatable and generally when in the position as shown in Fig. 5, that it becomes easily removable from the mouth of a fish with little if any damage resulting to the fish as the result of the removal of the hook.

A modification of applicants' fish hooking device is shown in Fig. 6 in which the parts are identical with those previously described bearing the same characters. Modification is shown in the pin 40 having a straight body portion 41 and a loop 42 at its upper end. Said pin 40 has a somewhat pointed lower end portion 43 adapted to be disposed in said loop portion 14. Carried on said body portion 41 is a coiled spring 45 having its upper end urged against the lower end of said looped portion 25 and held in such position by a lug portion 47 having a set screw 48 therein adapted to hold it in secured position on said pin 41. Thus the tension on said spring 45 may be adjusted by the upward or downward movement of said lug 47.

In operation, applicants' fish hooking device as shown in Fig. 6 will operate in substantially the same manner as the device previously described, with the exception that said pin 40 is urged into operating position for fishing purposes by the spring 45. To disengage said pin 40 from said loop portion 14 it is merely raised upwardly by the operator. There will be sufficient play in said loop portion 25 so that when not in operating position said pin 40 may be lowered to one side of the loop 14. When said pin 40 is raised out of the loops 14, said hook 10 will be freely rotatable about an axis at right angles to the axis of said staff 20.

Thus it is seen that we have provided a simply constructed fish hooking device easily operable to have the various parts thereof held together in rigid relationship for fishing purposes and adapted to have the fish hooking portion quickly freed to have substantial freedom of movement for removal from the mouth of a fish.

It will of course be understood that various changes may be made in the form, details, arrangement and proportions of the parts, without departing from the scope of applicants' invention, which, generally stated, consists in a device capable of carrying out the objects above set forth, in the parts and combinations of parts disclosed and defined in the appended claims.

What is claimed is:

1. A fish hooking device comprising a hook having a barb at one end and a looped portion at its other end, a pair of spaced shoulders formed on said hook adjacent said looped portion, a staff having an intermediate integral looped portion and having its lower end adapted to be looped about said hook between said shoulders, and a pin disposable through said looped portion of said staff and having its lower end adapted to be threaded into said looped portion of said hook to hold said hook and staff together in a rigid fishing position and to be removable from said hook to permit said hook to rotate about the axis of the lower looped portion of said staff for easy removal of said hook from the mouth of a fish.

2. A fish hooking device comprising a hook having a bight portion substantially in the form of a right angle having a barb at one end and having a coiled portion forming a looped portion at its other end, the axis of said looped portion being substantially in the plane of the axis of said bight portion adjacent said barb, a pair of spaced shoulders formed in said bight adjacent said looped portion, a staff having a coiled end portion disposed about said bight portion between said shoulders, said staff being formed with a plurality of coils intermediate its ends forming an elongated loop, a pin slidably disposable through said elongated loop and having at its lower end a threaded portion rotatably disposable into said looped portion to become operatively integral with said hook.

References Cited in the file of this patent
UNITED STATES PATENTS

| | | |
|---|---|---|
| 2,145,992 | Parker | Feb. 7, 1939 |
| 2,274,131 | Edberg | Feb. 24, 1942 |
| 2,501,210 | Cretin | Mar. 21, 1950 |
| 2,619,759 | Penninger | Dec. 2, 1952 |
| 2,795,074 | Loomis | June 11, 1957 |